J. B. LEWIS.
CHANGE MAKING MACHINE.
APPLICATION FILED SEPT. 13, 1913. RENEWED MAR. 1, 1915.

1,155,359.

Patented Oct. 5, 1915.
6 SHEETS—SHEET 4.

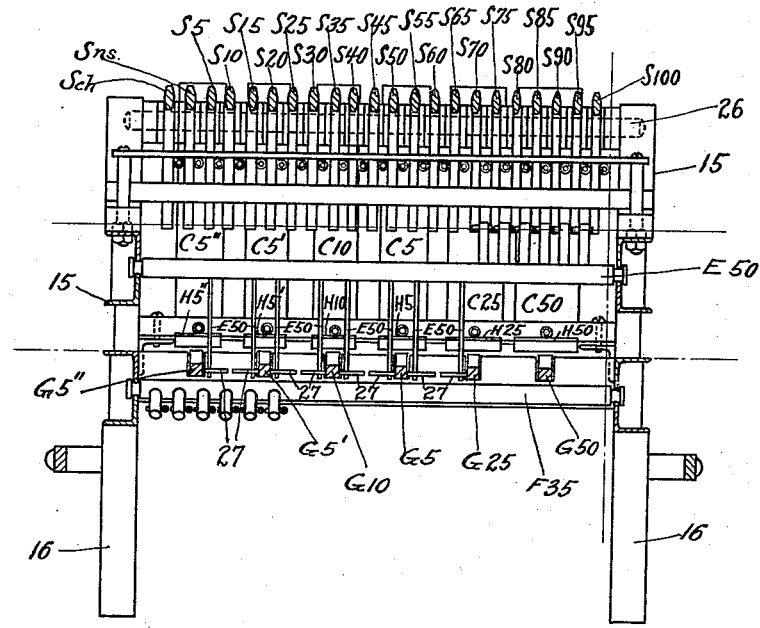
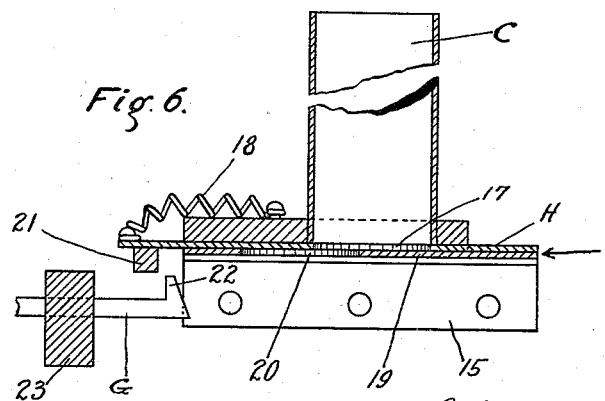

J. B. LEWIS.
CHANGE MAKING MACHINE.
APPLICATION FILED SEPT. 13, 1913. RENEWED MAR. 1, 1915.
1,155,359.                                Patented Oct. 5, 1915.
                                                 6 SHEETS—SHEET 6.
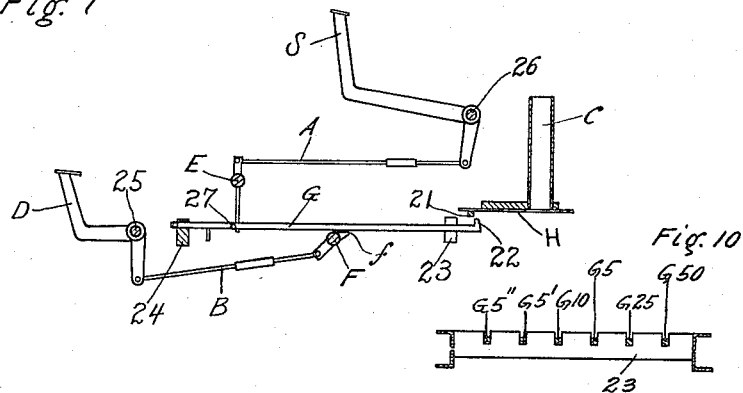
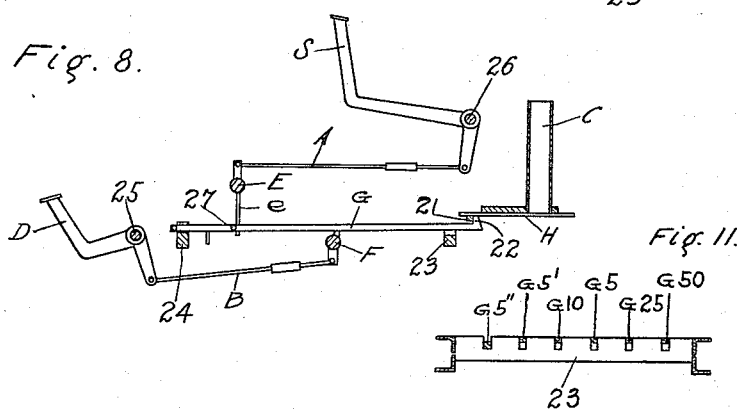
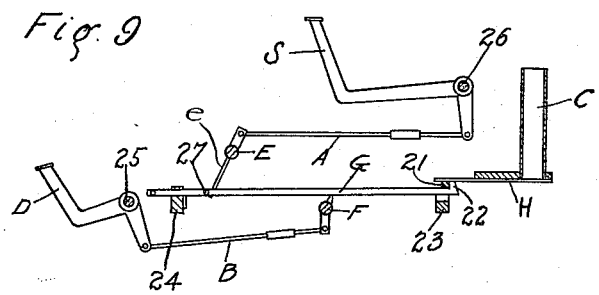

UNITED STATES PATENT OFFICE.

JOHN B. LEWIS, OF KIT CARSON, COLORADO, ASSIGNOR TO THE LEWIS CHANGE METER COMPANY, OF DENVER, COLORADO.

CHANGE-MAKING MACHINE.

1,155,359.              Specification of Letters Patent.         Patented Oct. 5, 1915.

Application filed September 13, 1913, Serial No. 789,685. Renewed March 1, 1915. Serial No. 11,326.

*To all whom it may concern:*

Be it known that I, JOHN B. LEWIS, a citizen of the United States, residing at Kit Carson, in the county of Cheyenne and State of Colorado, have invented certain new and useful Improvements in Change-Making Machines; and I do hereby declare the following to be a full, clear, and exact description of the invention, such as will enable others skilled in the art to which it appertains to make and use the same.

This invention relates to change making machines and has for an object to provide a device of the class embodying new and improved mechanism for discharging coins totaling in value to the difference between the coins deposited and the amount of the sale.

A further object of the invention is to provide a plurality of coin tubes for holding coins of various denominations under one dollar with slides beneath each of said tubes adapted to discharge a single coin from said tube and means for actuating one or more of said slides by mechanism controlled from a key depressed by the operator which depression actuates said slides to discharge coins of the value of the money deposited less the amount of the sale.

A further object of the invention is to provide in combination with coin tubes and slides as above mentioned sliding bars adapted when raised to engage and actuate the slides with improved means for raising the bars into engaging position, the bars raised depending upon the depression of a lever corresponding to the amount of money deposited.

A further object of the invention is to provide a plurality of key levers designated to correspond to the amount of sale with other levers actuated thereby for moving the longitudinally movable bars to actuate the coin slides, such movement being accomplished by a movement of a sales key lever.

With these and other objects in view the invention comprises certain novel constructions, combinations and arrangement of parts as will be hereinafter more fully described and claimed.

Figure 1:
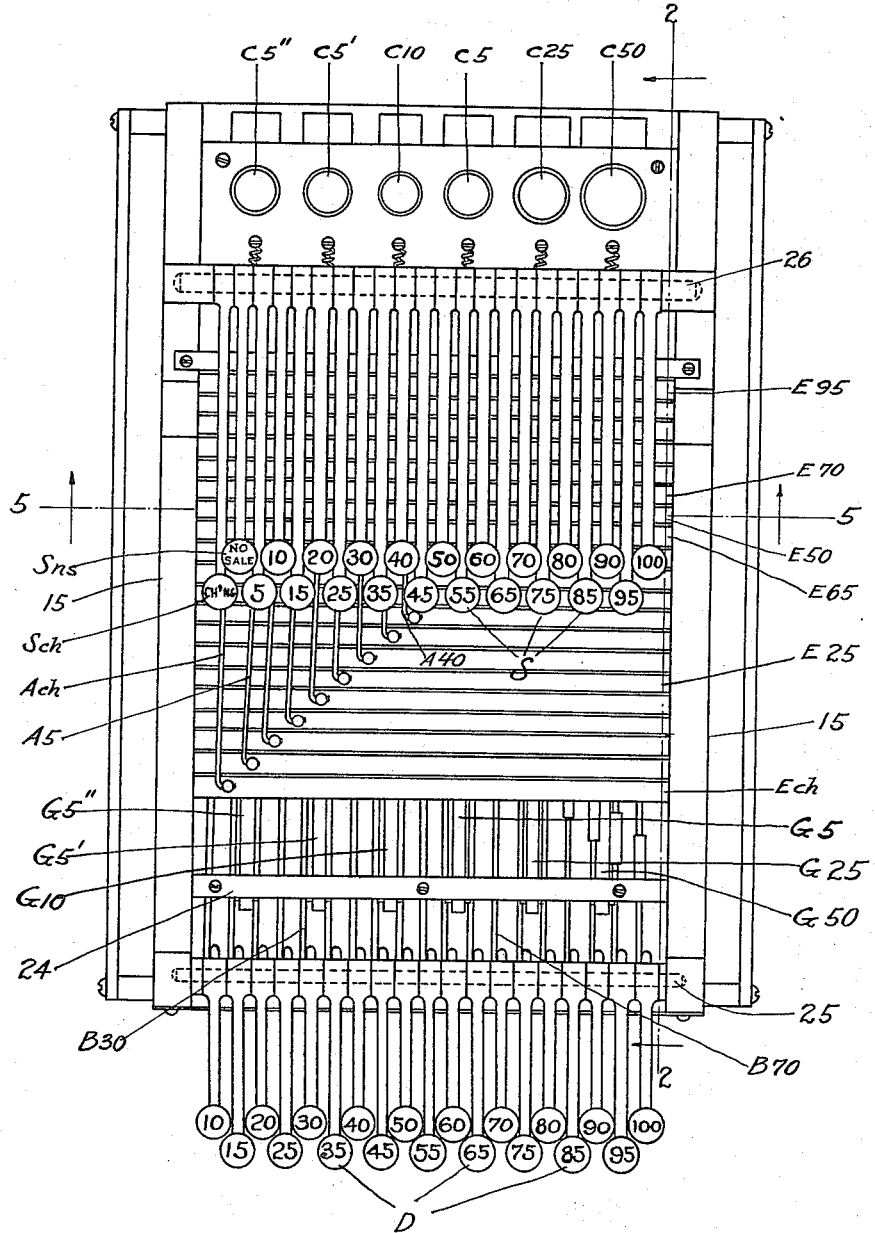
Figure 2:
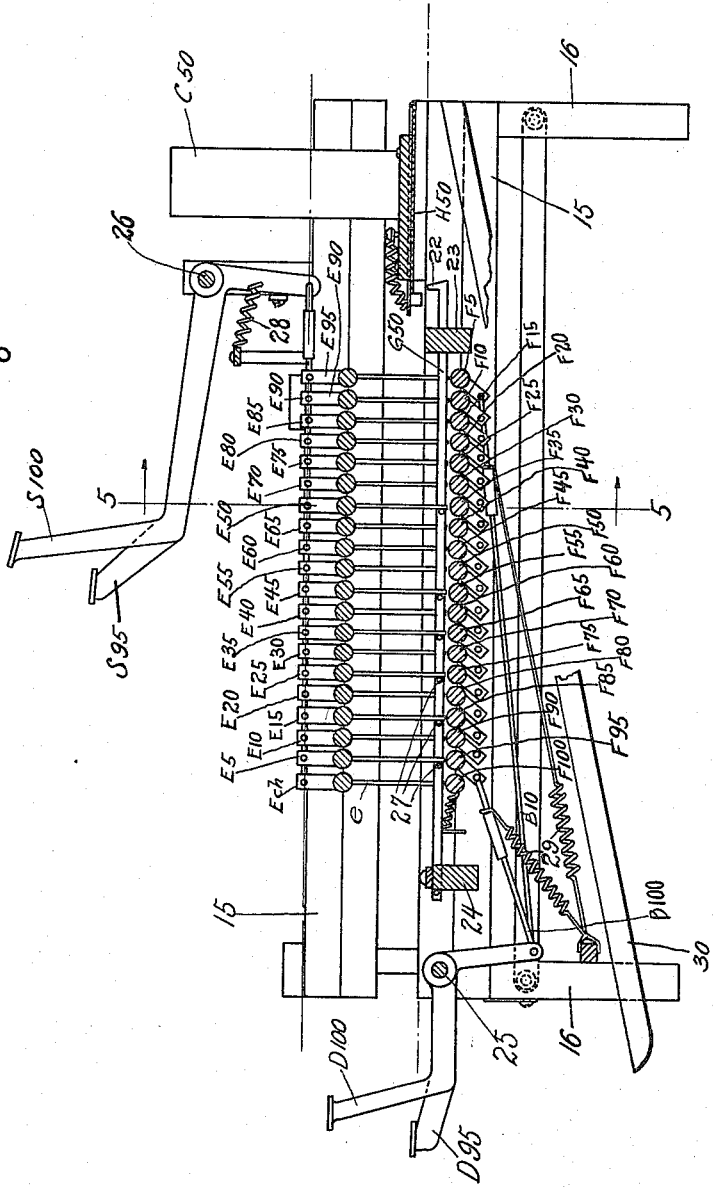
Figure 3:
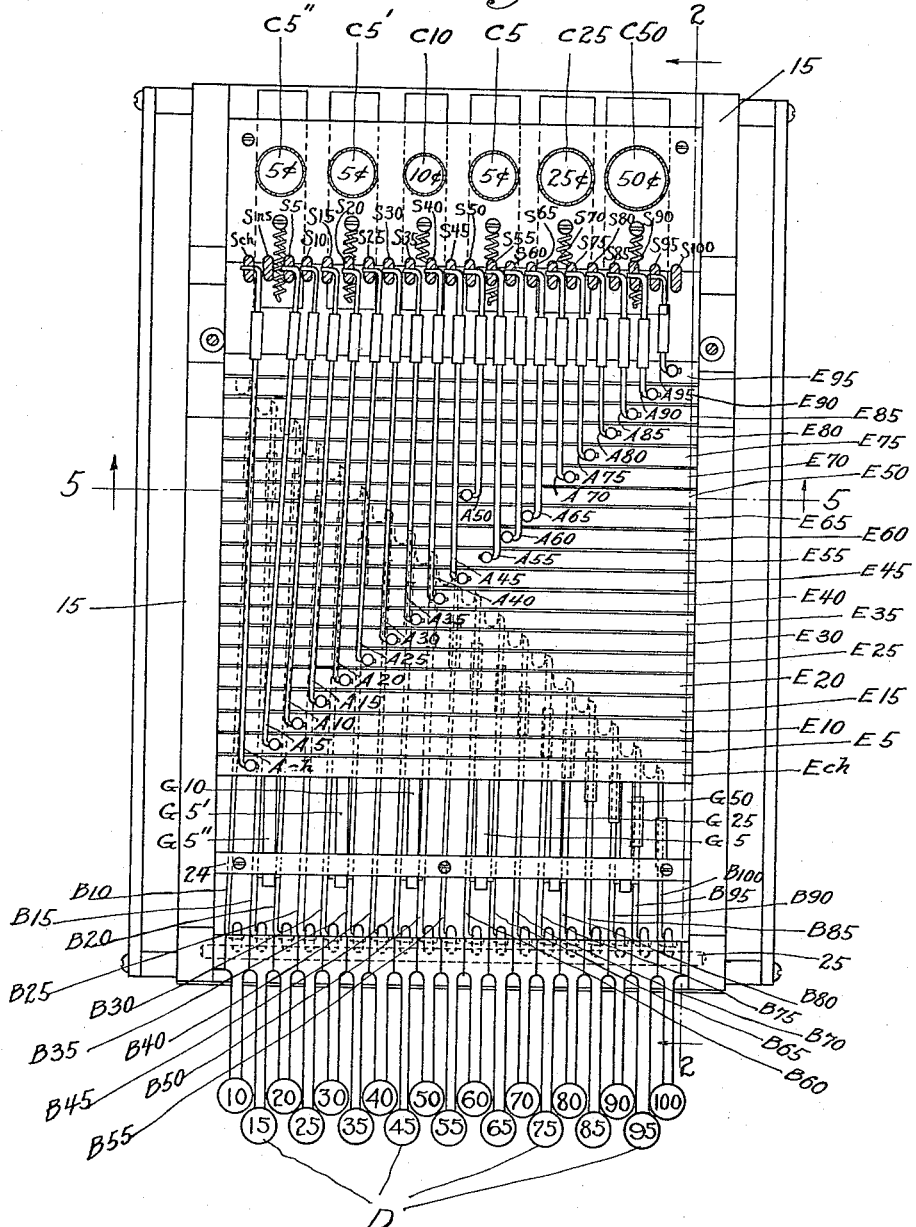
Figure 4:
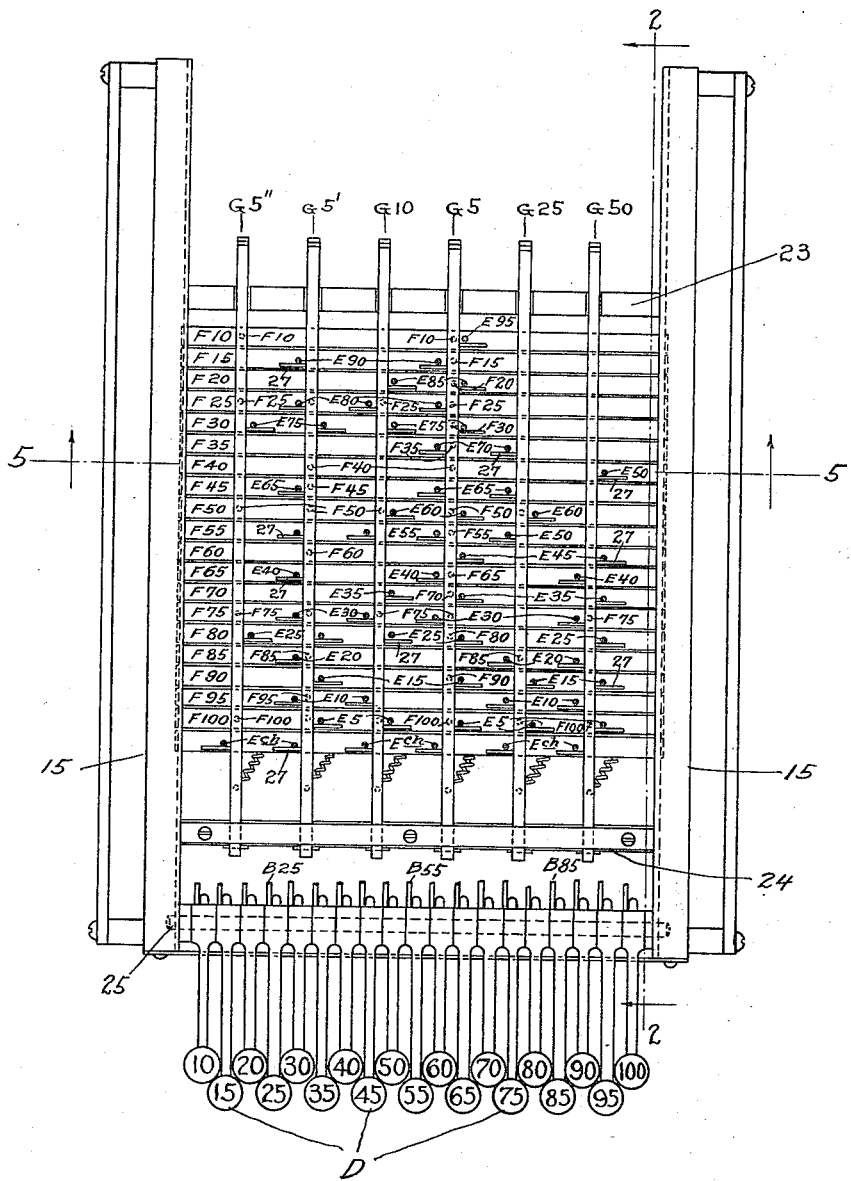

In the drawings: Figure 1 is a top plan view of the machine. Fig. 2 is a longitudinal sectional view taken on line 2—2 of Fig. 1. Fig. 3 is a top plan view of the machine with the sales key levers cut away and shown in section. Fig. 4 is a top plan view with the sales mechanism removed and showing only the deposit mechanism. Fig. 5 is a transverse sectional view taken on line 5—5 of Figs. 1, 2, 3 and 4. Fig. 6 is a detail sectional view of one of the coin tubes. Fig. 7 is a detail view of one unit of the mechanism shown in normal inoperative position. Fig. 8 is a view of one unit showing the deposit key depressed. Fig. 9 is a view of one unit with both the deposit and sales keys depressed. Fig. 10 is a view of one of the supporting rails showing the normal inoperative position of the coin slide operating bars. Fig. 11 is a view of one of the supporting rails with some of the operating bars raised into engaging position.

Like characters of reference designate corresponding parts throughout the several views.

The improved change making machine which forms the subject matter of this application comprises a frame 15 supported in any approved manner as upon the legs 16. The construction of the frame is wholly immaterial so long as it is arranged to accommodate the mechanism mounted therein and hereinafter described. At one end of the frame a plurality of tubes C are erected of proper diameter to receive and accommodate a column of superposed coins therein. As shown at Figs. 1 and 3 and reading from left to right the coin tubes will accommodate two stacks of nickels, one stack of dimes, one stack of nickels, one stack of 25 cent pieces and one stack of 50 cent pieces. All of these coin tubes are similar except in diameter and the construction of the same is shown at Fig. 6. Immediately beneath the tube C a slide H is provided having an opening 17 corresponding in diameter to the tube and registering therewith in normal position, such normal position being secured by a spring 18 which holds such slide normally in position shown at Fig. 6. Beneath the slide H a plate 19 is provided which prevents the passage of more than one coin into the opening 17 and also prevents the passage of such coin through the slide H until the plate is moved. The plate 19 is provided with an opening 20 through which the coin carried by the opening 17 is dropped when the slide H is moved forward. To cause such movement a cleat 21 is secured upon the under side of the slide H in position to be engaged by the hook 22 of the sliding bar G. The several sliding bars G are mounted to slide in rails 23 and 24, the latter being provided with a keeper which prevents the bars G from vertical movement while the former is provided with slots as shown particularly at Figs. 10 and 11 which permit the raising of the bars G. It will be noted especially from Figs. 2, 7, 8 and 9 that the hook 22 is capable of engaging with the cleat 21 only when the bars G are in raised position as shown in Figs. 8, 9 and 11. The raising of the bars G and hooks 22 into such engaging position is part of the selective process carried out by the mechanism. To raise such bars G a plurality of rock shafts F are journaled in the frame 15 extending transversely of the frame and having formed integral or rigid therewith cams f which engage under the bars G as shown at Figs. 7, 8 and 9 to at times raise such bars when the rock shafts are actuated. As shown at Fig. 4 the several rock shafts F do not all engage all of the bars G but only certain of said rock shafts engage certain of said bars. The reason for such engagement will be hereinafter more fully explained in explaining the operation of the machine. To actuate the rock shafts F "deposit" levers D are pivoted upon a bar 25 at the front of the machine and provided at their ends with keys properly designated in denominations of 5 cents from 10 cents to one dollar. The levers D are bell-crank levers and their lower legs are connected by means of rods B with the rock shafts F so that when one of the keys is depressed one of the rock shafts F is rotated and raises such bars G as are selectively actuated thereby. The raising of the bars G throws their hooks into position to operate the coin slides and to provide for such operation "sales" levers S are pivoted at 26 and connected through the medium of rods A with rock shafts E which are also journaled upon the frame immediately above the rock shafts F. The bars G are provided with pins 27 extending laterally from said bars and in position to be engaged by the depending fingers e of the rock shafts E. It will be apparent, therefore, that as the rock shafts E are rocked their fingers e engage the pins 27 extending from said sliding bars G to slide said bars and actuate the coin slides.

From an examination of Fig. 3 it will be apparent that each of the sales levers S is connected through the medium of a rod A with one of the rock shafts E and that each of the deposit levers D is connected through the medium of a rod B with one of the rock shafts F. Proper springs 28 are provided to return the sales levers to normal position while other springs 29 are provided to return the deposit levers D to normal position.

Taking the unit as shown at Figs. 7, 8 and 9 it will be apparent that by depressing the deposit key D the hooked end of the bar G will be raised into position to engage the cleat 21 and that by depressing the sales key S the said bar will be actuated to draw the coin slide H forward and drop a coin as described in relation to Fig. 6, which said coin will slide down the inclined chute 30 as shown at Fig. 2 into a position convenient to the operator. It will be obvious that not all of the units are actuated in the simple manner shown at Figs. 7, 8 and 9 but that certain selective combinations are necessary to produce a movement of the requisite parts to deposit the required change in the chute 30.

Assuming that the amount of money received is 50 cents and that the amount of the sale is 35 cents the operator depresses the deposit key D 50 and the sales key S 35. Through the depression of these two keys action of the mechanism is set up as follows: The depression of key D 50 rotates rock shaft F 50 (see Fig. 4) whereby all of the bars G are raised except G 50 as will be apparent from an examination of said figure which shows a cam f on rock shaft F 50 under each of said bars except under G 50. The bars G are, therefore, in position to engage coin slides aggregating 50 cents in value of the several denominations of 25 cents, 10 cents and 5 cents. The depression of the key S 35 rotates rock shaft E 35 which is immediately above rock shaft F 70 in Fig. 4. From an examination of said figure it will be seen that the fingers of the rock shaft E 35 engage bars G 50, G 5 and G 10. With a 50 cent deposit and a 35 cent sale it is obvious that 15 cents in change should be returned. The depression of the sales key 35 therefore actuates the sliding bars G 50, G 5 and G 10. The sliding bar G 50, however, is not raised to engage the coin slide so that the movement of said bar produces no result, but the movement of the bars G 10 and G 5 actuates their respective coin slides to deposit one dime and one nickel in the chute. If the amount received is 50 cents and the sale is 40 cents the depression of the deposit key 50 produces the result as above described but the depression of the sales key S 40 serves to move the sliding bars G 50, G 5 and G 5'. As above described the bar G 50 is not raised so that it moves without actuating its slide and the slides which are actuated are slides G 5 and G 5', as shown at Fig. 5. If the amount deposited is one dollar then the deposit key D 100 is depressed and from an examination of Fig. 4 it will be seen that the rotation of rock shaft F 100 raises all of the sliding bars G. If the amount of sale is 5 cents the change to be returned is obviously 95 cents. The depression of the sales key S 5 actuates the rock shaft E 5 and from an examination of Fig. 4 it will be seen that all of the bars G are actuated except the bar G 5″ so that 95 cents in change is deposited in the chute 30. If, on the other hand, the sale is 95 cents the amount of change to be returned is 5 cents and the sales key S 95 is depressed which rotates the rock shaft E 95 and from Fig. 4 it will be seen that E 95 actuates only the bar G 5 to deposit 5 cents in change in the chute. If the amount received is 75 cents the depression of deposit key D 75 rotates the rock shaft F 75 to raise all of the bars G except G 25 so that the bars are raised to engage coin slides of a value of 75 cents. If the sale is 60 cents then the sales key S 60 will be depressed thereby actuating the rock shaft E 60 to move the sliding bars G 5 and G 10 depositing 15 cents in change in the chute.

It will be understood that it is not necessary that the money actually received be deposited in the coin tubes C at the time of receipt, the only requisite being that coins be maintained in said tubes of sufficient value to supply the desired change. Provision is made for returning the entire amount in change. As for instance if change for one dollar is required the deposit key D 100 is depressed which actuates the rock shaft F 100 to raise all of the bars G and the change key Sch is depressed actuating the rock shaft Ech and it will be seen from Fig. 4 that the actuation of such rock shaft Ech will move all of the bars G simultaneously to return the full one dollar in change of the several denominations. The same is true of returning the change for 50 cents, the 50 cent deposit key being depressed which actuates the rock shaft F 50 to raise all of the bars G except G 50. The actuation of the change lever Sch will likewise rotate the rock shaft Ech to move all of the bars G, but as the bar G 50 is not raised only such bars as engage coin chutes aggregating 50 cents will be operated. For 25 cents change the key D 25 is depressed actuating the rock shaft F 25 to raise the bars G 5, G 5′, G 5″ and G 10. The actuation of the change key Sch moves all of said bars G but only the four bars aggregating 25 cents are in engagement with the coin slides and only 25 cents in change is deposited in the chute.

In Fig. 1 a key Sns is shown which is intended to be actuated when no sale is made. This key is provided for use in conjunction with a registering apparatus which is not shown in the present invention. When no registering apparatus is employed which is the condition of the mechanism disclosed in this application the key Sns will have no function.

I claim:—

1. In a change making machine, a coin tube, a coin slide beneath the tube, a reciprocable bar having a hooked end adapted when raised to engage with the slide, a deposit key, connections between the deposit key and the bar whereby the manual movement of the key raises the hooked end of the bar, a sales key, and connections between the sales key and the bar whereby the manual movement of the sales key moves the bar and slide.

2. In a change making machine, a coin tube, a coin slide disposed beneath the tube, a sliding bar positioned when raised to engage with the coin slide, a plurality of rock shafts under the bar, cams carried by some of said rock shafts for raising the bar into slide-engaging position, a plurality of deposit keys, connections between the deposit keys and the rock shafts whereby the depression of the deposit keys rotates the shafts, a plurality of sales keys, and connections between some of said sales keys and the bar whereby the depression of the sales keys moves the bar.

3. In a change making machine, a plurality of coin tubes, coin slides beneath said tubes, a plurality of bars mounted to slide beneath the coin tubes and having hooks adapted when raised to engage with the coin slides, a plurality of rock shafts journaled beneath the bars, cams carried by said rock shafts for raising the hooks of some of said bars selectively, a plurality of deposit keys connected with the rock shafts whereby the depression of the deposit keys rotates the shafts, and a plurality of sales keys connected with the bars whereby the depression of the sales keys moves the bars.

4. In a change making machine, a plurality of coin receptacles, mechanism for withdrawing a single coin from each of said receptacles, bars slidably mounted and adapted to engage with the coin withdrawing mechanism when raised, a plurality of rock shafts journaled beneath the bars, means carried by said rock shafts for raising some of said bars selectively, a plurality of deposit keys, connections between the deposit keys and the shafts whereby the depression of the keys rotates the shafts, a plurality of rock shafts journaled above the bars, fingers depending from said upper rock shafts, pins through the bars engaged by said fingers, a plurality of sales keys, and means connecting the sales keys and upper rock shafts whereby a depression of the sales keys rotates said upper rock shafts.

5. In a change making machine, a plurality of coin receptacles, mechanism for withdrawing a single coin from each of said receptacles, bars slidably mounted and adapted to engage with the coin withdrawing mechanism when raised, a plurality of rock shafts journaled beneath the bars, means carried by said rock shafts for raising some of said bars selectively, a plurality of deposit keys, connections between the deposit keys and the shafts whereby the depression of the keys rotates the shafts, a plurality of rock shafts journaled above the bars, means carried by said upper rock shafts for sliding the bars, a plurality of sales keys, and means connecting the sales keys and upper rock shafts whereby a depression of the sales keys rotates said upper rock shafts.

6. In a change making machine, a plurality of tubes proportioned to receive a stack of coins of a predetermined denomination, a slide mounted beneath each of said tubes and each provided with an opening adapted to permit a single coin from the stack to enter said opening, a cleat carried by said slide, bars mounted to slide equal in number to the coin tubes and each provided with an upstanding hook adapted to engage with the cleat when raised, a plurality of rock shafts journaled beneath the bars and each provided with means for raising one of said bars when rotated, a plurality of deposit keys, rods connecting the keys and rock shafts whereby a depression of the keys rotates the rock shafts, a plurality of rock shafts journaled above the bars, fingers downwardly extending from said upper rock shafts into moving engagement with the bars, sales keys mounted above the bars, and a rod connecting each of said sales keys with one of said upper rock shafts.

7. In a change making machine, a plurality of tubes proportioned to receive a stack of coins of a predetermined denomination, a slide mounted beneath each of said tubes and provided with an opening adapted to admit a single coin from the stack, a cleat carried by the lower side of said slide, bars movably mounted and each provided with an upstanding hook adapted when raised to engage with the cleat, a set of rock shafts journaled across the bars, and each provided with means for raising one of said bars when the shaft is rotated, a plurality of deposit keys, rods connecting the keys and rock shafts, a second set of rock shafts journaled above the first, fingers extending from said upper rock shafts into moving engagement with the bars, a plurality of sales keys, and a rod connecting each of said sales keys with one of said upper rock shafts.

In testimony whereof I affix my signature in presence of two witnesses.

JOHN B. LEWIS.

Witnesses:
D. C. LEWIS,
H. N. HENRY.

Copies of this patent may be obtained for five cents each, by addressing the "Commissioner of Patents, Washington, D. C."